J. M. O'NEALL.

GAS GENERATING APPARATUS.

APPLICATION FILED SEPT. 26, 1912.

Reissued Jan. 7, 1913.

13,506.

Witnesses:

Jas. E. Hutchinson:

Gertrude Wedemeier:

Inventor:

James M. O'Neall,

By Macomber & Williams Attorneys.

COLUMBIA PLANOGRAPH CO., WASHINGTON, D. C.

UNITED STATES PATENT OFFICE.

JAMES M. O'NEALL, OF ST. LOUIS, MISSOURI.

GAS-GENERATING APPARATUS.

13,506. Specification of Reissued Letters Patent. Reissued Jan. 7, 1913.

Original No. 998,546, dated July 18, 1911, Serial No. 559,869. Application for reissue filed September 26, 1912. Serial No. 722,535.

*To all whom it may concern:*

Be it known that I, JAMES M. O'NEALL, a citizen of the United States, residing in the city of St. Louis, in the State of Missouri, have invented certain new and useful Improvements in Gas-Generating Apparatus, of which the following is a specification.

This invention has relation to gas generators.

The object of the invention is to provide a suitable apparatus for generating a combustible gas which is produced by saturating a fluid forced downward through the apparatus, with certain elements, which the fluid encounters.

A further object is to provide a generating vessel comprising a plurality of chambers or compartments having restrained communication, distributing cups in some of the compartments; a supply reservoir; means for producing an equal air pressure above and below the contents of the reservoir and also forcing air through the various compartments of the vessel; and various other details of construction which will be hereinafter set forth.

Finally the object of the invention is to provide means of the character described that will be strong, durable, efficient and easy of operation, simple and comparatively inexpensive to construct, and also in which the several parts will not be likely to get out of working order.

Figure 1:
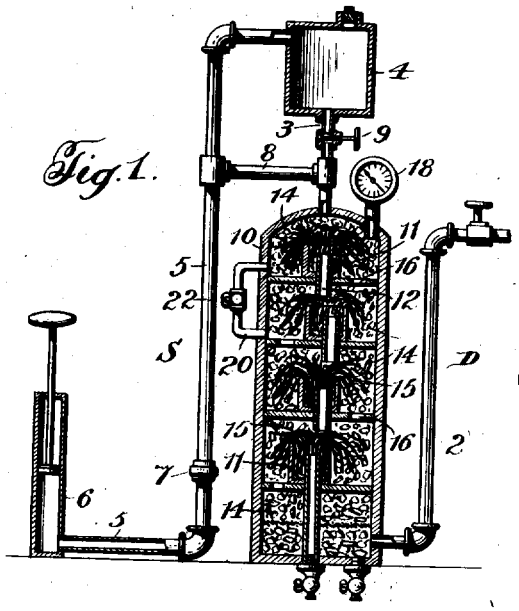
Figure 2:
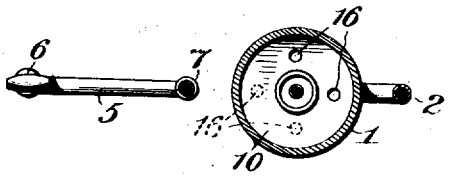
Figure 3:
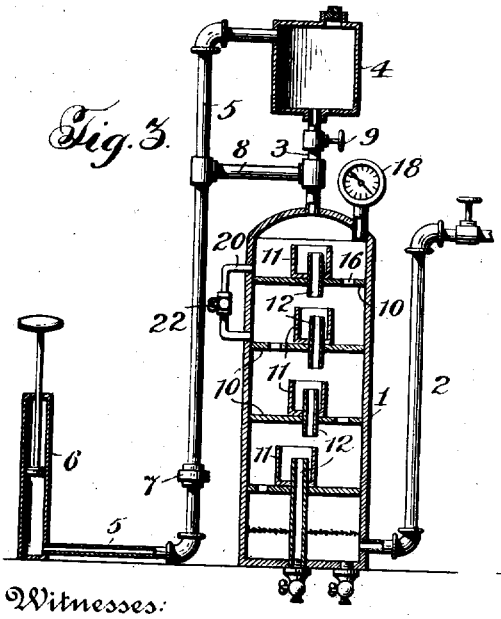
Figure 4:
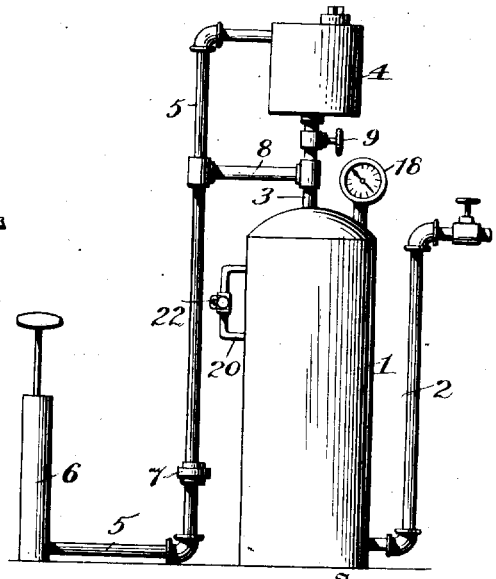

With the above and other objects in view, the invention has relation to certain novel features of construction and operation, an example of which is described in this specification and illustrated in the accompanying drawings, wherein:

Figure 1 is a vertical sectional view of the apparatus with portions of the pipe connections in elevation; Fig. 2 is a horizontal sectional view on the line S—D of Fig. 1; Fig. 3 is a view similar to Fig. 1 with the wicks and metal filling omitted; and Fig. 4 is an elevation of the apparatus.

In the drawings the numeral 1, designates a vertical cylindrical vessel having a discharge pipe 2 leading from its side near its lower end, and a supply or feed pipe 3 entering its top and supported therefrom. At its upper end, the pipe 3 enters the bottom of the reservoir 4 which has communication at its upper end with a pipe 5 extending from an air pump 6. By means of this pump air is forced through the pipe 5 past a suitable check valve 7 which prevents back pressure. It is to be understood that while I have shown a hand pump, a power operating pump may be employed. From the pipe 5, a branch pipe 8 leads to the supply pipe 3. Between the branch pipe and the bottom of the reservoir, a suitable regulating or feed valve 9 is connected in the supply pipe. It is obvious that the pressure of the air delivered into the upper portion of the reservoir will be substantially the same as the pressure of the air passing through the branch pipe 8 to the supply pipe 3. Thus the pressure above and below the contents of the reservoir will be substantially equal thereby permitting a gravity feed into the supply pipe regulated by the valve 9.

In the reservoir 4 which has a suitable opening in its top, an acid or an acidulous fluid, such as common vinegar, or salt, such as common salt, and volatile oil, such as gasolene, may be placed. Acids and hydrocarbon oils may be introduced into the reservoir as well as iron filings if desired.

The vessel 1 is divided into a plurality of horizontal chambers by cross partitions 10, each receiving the hollow stem 12 of a cup 11, the cup resting on the partitions and the stems passing through the partitions and terminating a short distance below the same. Beginning with the upper cup, each alternate one is disposed substantially at the center of the partition, while the intermediate cups are off-center or eccentric, but not to such an extent that the stem of one cup will not deliver into the cup below. This arrangement places the cups in staggered relation vertically, but each with a portion substantially in vertical alinement with the supply pipe 3.

In each compartment a filling of metal 14 such as iron or steel is placed. This metal should be such as will readily rust and may be in such form or shape as is suitable. Iron or steel filings mixed with small pieces of "scrap" have been used with good results. The cups are filled with suitable strands of fiber, cotton wicking, or waste 15, which extend from the cups and is interspersed in the metal filling, that is the strands are separated and mixed in with the particles and pieces of the metal filling.

The process of capillary attraction is employed, or in other words the mixture delivered from the suply pipe 3 to the uppermost cup, and from it to the others, is distributed or spread into the metal filling by the fibrous material 12, the strands of the fibrous material being saturated by the process of capillary attraction.

It will be noted that there is no cup in the lowermost chamber of the vessel and it is intended that only enough of the mixture should enter this chamber to thoroughly cover the metal filling without any surplus or overflow. The object of the cups is to catch or retain the mixture passing from one chamber to the next lowermost one and the supply will decrease as it passes downward. Of course sufficient amounts of the mixture must be supplied to the cups to saturate the fibrous strands, the surplus from each cup passing through the stem 12 to the next lowest cup.

Each partition is provided with a pair of openings 16, the openings of one partition being out of line with those of the adjacent partition, as indicated in Fig. 2. The cups are filled with the fibrous material to such an extent that light fluids such as gas and air cannot pass therethrough and must pursue a circuitous path through the chambers and their filling by passing through the openings 16.

The mixture hereinbefore described is calculated to rust the metal fillings. Acid and salt and such material as produce rust from iron when introduced into the receptacle 1 produce gas. The metal or iron filings when subjected to these materials produces rust and heat. The oils are converted into gas and mix with the fumes and rust. The current of air forced into the vessel has only sufficient pressure to cause it to flow downward and become saturated with the mixture, laden with which it passes out of the vessel through the pipe 2.

Much stress is laid on the fact that the mixture is fed to the vessel by gravity and the air is passed through or over the gas producing mixture with only enough pressure to cause it to flow in its proper course. It is one of the objects of this invention to produce gas without a high air pressure and with only a "flowing" pressure.

The fumes produced by mixing the acid, filings and salt after the acid and salt has been introduced into the receptacle 1, rise. The hydrogen thus generated is carbureted by means of the vapors of hydrocarbon oil and the air which is forced into the vessel. This mixture of various elements produces a commercial gas.

Tests have shown that this gas produces an intense heat and when burned, gives a soft mellow light. It is inexpensive to produce and having a low pressure its liability to explode is reduced to a minimum.

For indicating the pressure of the air in the upper portion of the vessel 1, a suitable gage 18 is placed thereon. If the quantity of the mixture fed to the uppermost chamber accumulates too fast therein it can be relieved, and a portion quickly conveyed to the next lowermost chamber by means of a "bleeder" pipe 20, at the side of the vessel, in which pipe a cut-off valve 22 is included.

It is pointed out that it is possible to generate gas in each chamber of the vessel. However the gas becomes "richer" as it emerges from each chamber and a better gas is produced by passing the air through the several chambers and thoroughly saturating it with the gas producing elements.

What I claim is:—

1. An apparatus comprising a vessel containing gas making materials, and having provision for pouring acid therein, a second vessel communicating with the first named vessel, partitions dividing the second vessel into compartments, inner vessels mounted on said partitions, short pipes projecting through said inner vessels and partitions, the partitions having openings, the compartments having communication with each other through the openings, and a service pipe connected with the lowermost compartment.

2. An apparatus comprising a vessel having provision for pouring acids into said vessel, a second vessel communicating with the first named vessel, partitions dividing the second vessel into compartments, vessels mounted in staggered relation on said partitions, short pipes projecting through said staggered vessels and partitions, said partitions having openings, the compartments of the second vessel having communication through the openings of the partitions, and a service pipe connected with the lowest compartment.

3. An apparatus comprising a vessel having provision for pouring acids into said vessel, a second vessel communicating with the first named vessel, partitions dividing the second vessel into compartments, inner vessels mounted on said partitions, short pipes projecting through said inner vessels and partitions, said partitions having openings, the compartments of the second vessel having communication through the openings of the partitions, a service pipe connected with the lowest compartment, and a device for forcing air into both vessels.

4. An apparatus comprising a vessel having provision for pouring acids into said vessel, a second vessel communicating with the first named vessel, partitions dividing the second vessel into compartments, inner vessels mounted on said partitions, short pipes projecting through said inner vessels and partitions, said partitions having openings, the compartments of the second vessel having communication through the openings of the partitions, a service pipe connected with the lowest compartment, a pipe outside of the second vessel establishing communication between the two uppermost compartments thereof, and a cut off valve in said pipe.

5. In a gas generating apparatus, an upper vessel, a lower vessel, a connection between the vessels supporting the upper vessel above the lower vessel and establishing communication between the vessels, horizontal partitions dividing the lower vessel into compartments, the compartments having communication one with the other, an inner vessel mounted at the central portion of each partition, metal filings or slugs disposed on the partitions about the vessels, short stems or pipes extending from the inner vessel through the partitions, one stem extending from each inner vessel and the stems being disposed in staggered relation, wicks extending from the inner vessel into the metal filings, a service pipe connected to the lowermost compartment, and a device for forcing air into the lower vessel.

6. In a gas generating apparatus, a vessel, a plurality of horizontal partitions dividing the vessel into compartments, the partitions having openings between the compartments, a supply pipe entering the central portion of the top of the vessel, a reservoir supported above the vessel, an inner vessel mounted at the central portion of each partition, the uppermost inner vessel being disposed directly under the supply pipe, metal filings or slugs disposed on the partitions, about the inner vessels, short stems or pipes extending from the inner vessels through the partitions in staggered relation, wicks in the inner vessels extending therefrom into the metal filings, a service pipe leading from the lowermost compartment, and a device for supplying air to the vessel.

7. In a gas generating apparatus, a vessel adapted to contain gas making materials, a second vessel communicating with the first named vessel, partitions dividing the second vessel into compartments, vessels mounted on said partitions, short pipes projecting through said vessels and partitions, said partitions having openings whereby each compartment has communication with the adjacent compartment, and a service pipe connected with the lowermost compartment.

8. In a gas generating apparatus, two vessels connected together, gas making materials contained in one of said vessels, the other vessel having horizontal partitions partly dividing the vessel into compartments, vessels mounted on said partitions, short pipes projecting through said vessels and said partitions, gas making materials placed on said partitions, and a service pipe connected with the lowest compartment.

9. In a gas generating apparatus, two vessels, a pipe connecting the two vessels, one vessel being placed above the other, the upper vessel containing gas making materials, the lower vessel having horizontal partitions partly dividing the vessel into communicating compartments, vessels placed on said partitions, short pipes projecting through said vessel and through said partitions, gas making materials placed on said partitions, the passages through said partitions alternating from side to side, and a service pipe connected to the lowest compartment.

10. In a gas generating apparatus, two vessels, a pipe connecting said vessels, one vessel being placed above the other, the upper vessel containing gas making materials, the lower vessel having partitions dividing the same into compartments, gas making materials on said partitions, vessels mounted on said partitions, short pipes projecting through said vessels and partitions, means for forcing air into said lower vessel, a service pipe connected to the lowest compartment, and a screen interposed between the lowest partition and said service pipe.

11. In a gas generating apparatus, upper and lower vessels, a pipe connecting the two vessels, the upper vessel containing gas making materials, the lower vessel having horizontal partitions dividing the same into compartments, vessels placed on said partitions, short pipes projecting through said vessels, said partitions having passages therethrough, gas making materials placed upon said partitions and in said vessel, wicks for siphoning material out of said vessels on the gas making materials on the partitions, means for forcing air into said lower vessel, and a service pipe connected to the lowest compartment in said lower vessel.

12. In a gas generating apparatus, a vessel, partitions dividing said vessel into compartments communicating with each other, inner vessels mounted on said partitions, and short pipes projecting through said inner vessels and discharging through the partitions.

13. In a gas generating apparatus, a vessel, partitions dividing the vessel into compartments, vessels mounted on said partitions having short pipes arranged in staggered relation and projecting through the vessels to discharge through the partitions, said partitions having openings to afford communication between the compartments.

14. In a gas generating apparatus, a vessel, horizontal partitions dividing said vessel into compartments, the compartments having communication one with the other, an inner vessel mounted at approximately the central portion of each partition, gas making materials disposed on the partitions about the vessels, short stems or pipes extending from the inner vessels and discharging through the partitions, the stems being disposed in staggered relation, and wicks extending from the inner vessels to the gas making materials thereabout.

15. In a gas generating apparatus, a vessel containing gas making materials, a container within the upper portion of said vessel for gas making materials, and a wick leading from the interior of said container to the gas making material in the vessel adjacent to said container.

16. In a gas generating apparatus, a vessel containing gas making materials, a container within the upper portion of said vessel for gas making materials, and a wick leading from the interior of said container to the gas making material in the vessel adjacent to said container, said wick being inserted into the container at one end and passing out over the container to depend at its opposite end into the gas making material in the vessel.

17. In a gas generating apparatus, a vessel containing gas making materials, a container within the upper portion of said vessel for gas making materials, and a wick leading from the interior of said container to the gas making material in the vessel adjacent to said container, the wick substantially filling the container, and communicating compartments beneath said container.

18. In a gas generating apparatus, a vessel, a series of communicating compartments therein adapted to support gas making material, a container for gas making materials within the upper portion of said vessel, and a wick affording communication between the interior of said container and the gas making material adjacent thereto.

19. In a gas generating apparatus, a vessel, a series of communicating compartments therein adapted to support gas making material, a container for gas making materials within the upper portion of said vessel, and a wick affording communication between the interior of said container and the gas making material adjacent thereto, the container having an overflow passage leading from its interior adapted to feed to a compartment therebeneath.

20. In a gas generating apparatus, a vessel, partitions dividing the vessel into compartments, vessels on said partitions having overflow passages leading from the interior thereof at points substantially above the bottoms thereof to the next adjacent vessel, the partitions having openings to afford communication between the several compartments, and means for feeding material from the vessels to material adjacent thereto supported on the partitions.

In testimony whereof, I hereunto affix my hand and seal this 11th day of September, 1912.

JAMES M. O'NEALL.

Witnesses:
M. P. Smith,
M. A. Handel.

Copies of this patent may be obtained for five cents each, by addressing the "Commissioner of Patents, Washington, D. C."